(12) United States Patent
Mousavi et al.

(10) Patent No.: US 10,365,619 B2
(45) Date of Patent: Jul. 30, 2019

(54) TECHNOLOGIES FOR OPTIMALLY INDIVIDUALIZED BUILDING AUTOMATION

(71) Applicant: ABB Technology Ltd., Zurich (CH)

(72) Inventors: Mirrasoul J. Mousavi, Cary, NC (US); James Stoupis, Raleigh, NC (US); Shakeel M. Mahate, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 105 days.

(21) Appl. No.: 14/740,936

(22) Filed: Jun. 16, 2015

(65) Prior Publication Data

US 2016/0370773 A1 Dec. 22, 2016

(51) Int. Cl.
*H04L 12/28* (2006.01)
*G05B 15/02* (2006.01)

(52) U.S. Cl.
CPC .......... *G05B 15/02* (2013.01); *H04L 12/2816* (2013.01); *G05B 2219/25167* (2013.01); *G05B 2219/2642* (2013.01)

(58) Field of Classification Search
USPC ................ 700/275, 276, 277, 278, 299, 300
See application file for complete search history.

(56) References Cited

U.S. PATENT DOCUMENTS

| | | | |
|---|---|---|---|
| 2012/0169482 A1* | 7/2012 | Chen ...................... | G08C 17/02 340/12.52 |
| 2013/0024799 A1* | 1/2013 | Fadell ................ | G05D 23/1905 715/771 |
| 2013/0073094 A1 | 3/2013 | Knapton et al. | |

(Continued)

FOREIGN PATENT DOCUMENTS

GB 2480009 A 11/2011

OTHER PUBLICATIONS

EP Search Report from EP 16 17 1234 dated Oct. 13, 2016, 10 pages.

(Continued)

*Primary Examiner* — Robert E Fennema
*Assistant Examiner* — Marzia T Monty
(74) *Attorney, Agent, or Firm* — Barnes & Thornburg LLP (57) ABSTRACT

Technologies for individualized building automation include a building automation application server, a building controller, and several mobile computing devices. Each mobile computing device generates individualized sensor data based on the time and location of the mobile computing device and sensor data indicative of a building system control parameter. The sensor data may include temperature data, humidity data, or other environmental data, and may be received by the mobile computing device from one or more external sensors. The building automation application server receives the individualized sensor data from the mobile computing devices and generates a building system configuration based on the individualized sensor data. The building automation application server may optimize the building system configuration for cost, efficiency, or user comfort based on the individualized sensor data. The mobile computing devices and the building automation application server may communicate via one or more collection servers. Other embodiments are described and claimed.

24 Claims, 4 Drawing Sheets

(56) References Cited

U.S. PATENT DOCUMENTS

| | | | | |
|---|---|---|---|---|
| 2013/0127591 A1* | 5/2013 | Shay | ............... | G07Q 9/00087 |
| | | | | 340/5.52 |
| 2014/0031991 A1* | 1/2014 | Bergman | ............... | F24F 11/30 |
| | | | | 700/276 |
| 2014/0266669 A1* | 9/2014 | Fadell | ............... | G05B 19/042 |
| | | | | 340/501 |
| 2015/0100167 A1* | 4/2015 | Sloo | ............... | F24F 11/30 |
| | | | | 700/278 |
| 2015/0134085 A1* | 5/2015 | Brissman | ............... | G05D 23/1932 |
| | | | | 700/66 |
| 2015/0369509 A1* | 12/2015 | Schwarz | ............... | H04L 67/125 |
| | | | | 700/276 |
| 2016/0062332 A1* | 3/2016 | Call | ............... | G05B 19/042 |
| | | | | 700/276 |
| 2016/0069585 A1* | 3/2016 | Shrubsole | ............... | H04L 12/282 |
| | | | | 700/276 |
| 2016/0070276 A1* | 3/2016 | Joshi | ............... | G06Q 30/0269 |
| | | | | 705/14.66 |
| 2016/0091217 A1* | 3/2016 | Verberkt | ............... | G06F 8/654 |
| | | | | 700/276 |
| 2016/0234034 A1* | 8/2016 | Mahar | ............... | H04L 12/282 |
| 2017/0038753 A1* | 2/2017 | Shah | ............... | G05B 15/02 |

OTHER PUBLICATIONS

Wired, "13 Lessons for Design's New Golden Age," Sep. 2014, available at http://www.wired.com/2014/09/design-package-2014 (4 pages).

Tado, "Intelligent Climate Control," available at https://www.tado.com/gb, last accessed Mar. 31, 2015 (10 pages).

* cited by examiner

TECHNOLOGIES FOR OPTIMALLY INDIVIDUALIZED BUILDING AUTOMATION

BACKGROUND

Building automation systems typically use a network of fixed sensors installed throughout a building to monitor the building and control building systems. The costs associated with installing fixed sensors and the lack of retrofit ability for existing buildings may hinder the widespread adoption of building automation solutions. Additionally, fixed sensors may require extensive recalibration over large areas of building infrastructure, which may render the original costs of the fixed sensors as a sunk cost.

SUMMARY

According to one aspect, a computing device for building automation individualization is disclosed. The computing device includes a mobile interface module, a building automation module, and a controller interface module. The mobile interface module is to receive individualized sensor data from a mobile computing device. The individualized sensor data is indicative of a location of the mobile computing device, a current time, and a building system control parameter. The building automation module is to determine a building system configuration based on the individualized sensor data. The controller interface module to configure a building controller based on the building system configuration to control a building system of a building. In some embodiments, the building automation module is further to receive fixed sensor data from a fixed sensor. The fixed sensor data is indicative of the building system control parameter, and to determine the building system configuration includes to determine the building system configuration based on the individualized sensor data received from the mobile computing device and the fixed sensor data received from the fixed sensor.

In some embodiments, to determine the building system configuration based on the individualized sensor data may include to optimize the building system configuration for cost, efficiency, or comfort based on the individualized sensor data. In some embodiments, to determine the building system configuration based on the individualized sensor data may include to determine a value of the building system control parameter based on the individualized sensor data and determine the building system configuration based on the value of the building system control parameter.

In some embodiments, the mobile interface module is further to transmit feedback data to the mobile computing device in response to configuration of the building controller, wherein the feedback data is indicative of the building system configuration.

In some embodiments, to receive the individualized sensor data from the mobile computing device may include to receive the individualized sensor data via a collection server. In some embodiments, to receive the individualized sensor data may include to connect to the collection server via a public network. In some embodiments, to receive the individualized sensor data may include to connect to the collection server via a local area network of the building. In some embodiments, the collection server may include a personal area network beacon device.

According to another aspect, a method for building automation individualization is disclosed. The method includes receiving, by a computing device, individualized sensor data from a mobile computing device, wherein the individualized sensor data is indicative of a location of the mobile computing device, a current time, and a building system control parameter; determining, by the computing device, a building system configuration based on the individualized sensor data; and configuring, by the computing device, a building controller based on the building system configuration to control a building system of a building.

In some embodiments, determining the building system configuration based on the individualized sensor data may include optimizing the building system configuration for cost, efficiency, or comfort based on the individualized sensor data. In some embodiments, determining the building system configuration based on the individualized sensor data may include determining a value of the building system control parameter based on the individualized sensor data; and determining the building system configuration based on the value of the building system control parameter.

In some embodiments, the method further includes transmitting, by the computing device, feedback data to the mobile computing device in response to configuring the building controller, wherein the feedback data is indicative of a user reward.

In some embodiments, receiving the individualized sensor data from the mobile computing device may include receiving the individualized sensor data via a collection server.

According to another aspect, a computing device for building automation individualization is disclosed. The computing device includes a location module, a sensor module, and a building automation module. The location module is to determine a location of the computing device. The sensor module is to receive sensor data from a sensor of the computing device. The sensor data is indicative of a building system control parameter. The building automation module is to generate individualized sensor data, determine whether to upload the individualized sensor data, and transmit the individualized sensor data to a building automation application server associated with a building in response to a determination to upload the individualized sensor data. The individualized sensor data is indicative of the location of the computing device, a current time, and the sensor data.

In some embodiments, to determine the location of the computing device may include to determine whether the computing device is located at the building. In some embodiments, to determine whether to upload the individualized sensor data may include to determine whether to upload the occupant data based on the location of the computing device.

In some embodiments, to receive the sensor data may include to receive environmental sensor data, temperature sensor data, humidity sensor data, motion sensor data, ambient light sensor data, camera data, audio sensor data, or sensor fusion data. In some embodiments, to receive the sensor data may include to receive sensor data from a remote sensor device. In some embodiments, to receive the sensor data may include to monitor user input to the computing device, wherein the user input is indicative of a user sentiment.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
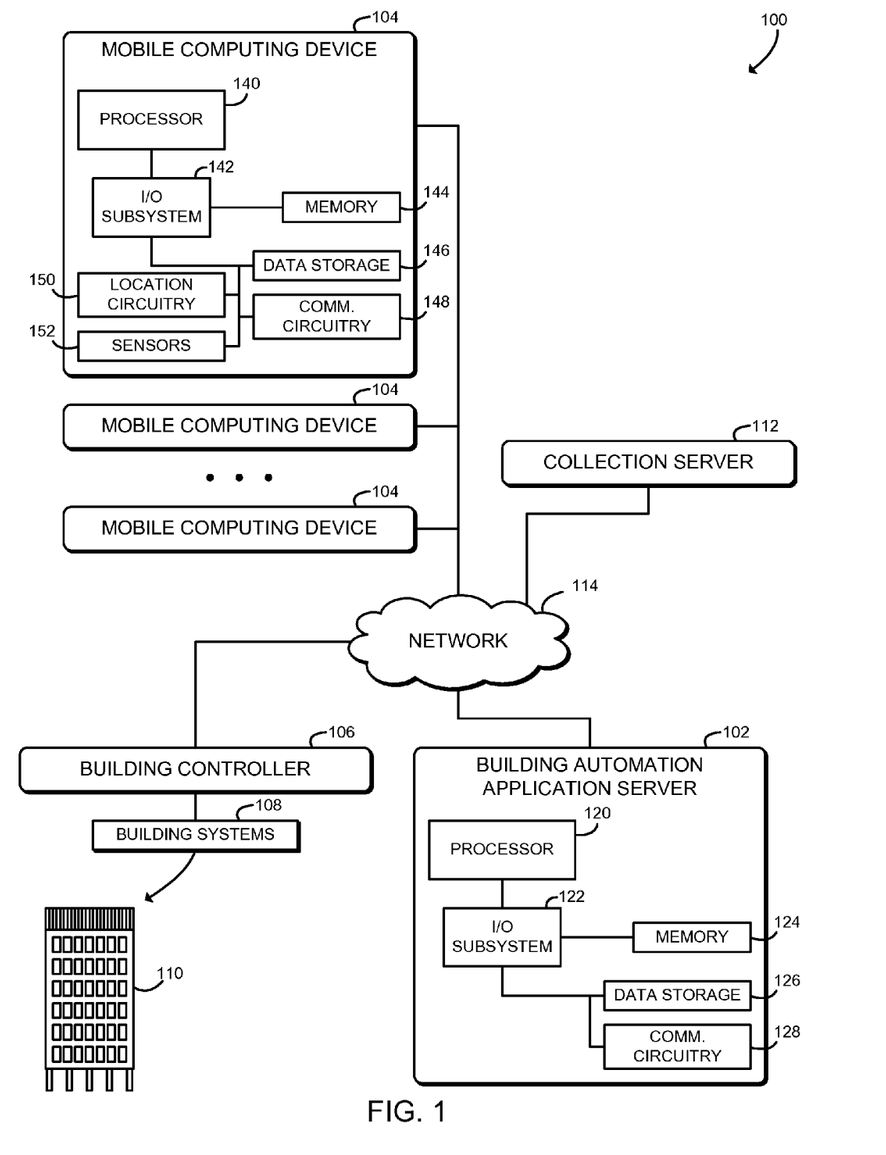
FIG. 1 is a simplified block diagram of at least one embodiment of a system for individualized building automation.

Referring now to FIG. 1, in an illustrative embodiment, a system 100 for individualized building automation includes a building automation application server 102, several mobile computing devices 104, a building controller 106, and a collection server 112 in communication over a network 114. In use, as described in more detail below, the building controller 106 controls one or more building systems 108 (e.g., heating, ventilation, and air conditioning (HVAC) systems, lighting systems, safety systems, security systems, access control systems, wireless network systems, vending machine systems, electronic system controllers, programmable logic controllers, etc.) associated with a building 110. Each of the mobile computing devices 104 monitors one or more sensors to generate time- and geo-tagged individualized sensor data. The individualized sensor data may include environmental sensor data such as temperature, relative humidity, pressure, occupancy data, or any other data that may be used to control one or more of the building systems 108. The mobile computing devices 104 transmit the individualized sensor data to the building automation application server 102, which uses the individualized sensor data to fine-tune and/or optimize the configuration and settings of one or more of the building systems 108. Of course, in some embodiments, the building automation application server 102 may poll an approved list of mobile computing devices 104 and/or other systems to receive the individualized sensor data. The building automation application server 102 configures the building controller 106 with the updated building system configuration. The mobile computing devices 104 and/or the building automation application server 102 may limit monitoring to mobile computing devices 104 that are within or nearby the building 110. Essentially, the system 100 uses individual users as distributed sensors, and thus by using sensors and devices already carried by many people, the system 100 may reduce costs and improve sensor coverage compared to using fixed sensors for building automation applications in existing and new buildings 110. Additionally, by monitoring data from many devices, the system 100 may provide more accurate and individualized building system control, allowing for individualized occupant experience, preference, and comfort. Additionally, by using redundant sensor data from many devices, sensor accuracy requirements may be relaxed by leveraging sensor fusion techniques to fill gaps in the data and reject bad data. The redundant sensor data from many devices may also provide mitigation against cyber-attacks and data compromise.

The building automation application server 102 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. As shown in FIG. 1, the building automation application server 102 illustratively includes a processor 120, an input/output subsystem 122, a memory 124, a data storage device 126, and communication circuitry 128. Of course, the building automation application server 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments. Additionally, in some embodiments, the building automation application server 102 may be embodied as a "virtual server" formed from multiple computing devices distributed across the network 114 and operating in a public or private cloud. Accordingly, although the building automation application server 102 is illustrated in FIG. 1 as embodied as a single server computing device, it should be appreciated that the building automation application server 102 may be embodied as multiple devices cooperating together to facilitate the functionality described below.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the building automation application server 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the building automation application server 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The data storage device 126 may be embodied as any type of device or devices configured for short-term or long-term storage of data such as, for example, memory devices and circuits, memory cards, hard disk drives, solid-state drives, or other data storage devices. The communication circuitry 128 of the building automation application server 102 may be embodied as any communication circuit, device, or collection thereof, capable of enabling communications between the building automation application server 102, the mobile computing devices 104, the building controller 106, the collection server 112, and/or other remote devices over the network 114. The communication circuitry 128 may be configured to use any one or more communication technology (e.g., wired or wireless communications) and associated protocols (e.g., Ethernet, Bluetooth®, Wi-Fi®, WiMAX, etc.) to effect such communication.

Each mobile computing device 104 is configured to transmit individualized sensor data, which may be based on sensor data or user input data captured by the mobile computing device 104, to the building automation application server 102 as described further below. The mobile computing device 104 may be embodied as any type of computation or computer device capable of performing the functions described herein, including, without limitation, a smart phone, a tablet computer, a wearable computing device, a notebook computer, a laptop computer, a computer, a multiprocessor system, a desktop computer, a server, a network appliance, an in-vehicle infotainment system, a web appliance, a distributed computing system, a processor-based system, and/or a consumer electronic device. Illustratively, the mobile computing device 104 includes a processor 140, an I/O subsystem 142, a memory 144, a data storage device 146, communication circuitry 148, and/or other components and devices commonly found in a smart phone or similar computing device (e.g., a touchscreen display or other I/O devices). Those individual components of the mobile computing device 104 may be similar to the corresponding components of the building automation application server 102, the description of which is applicable to the corresponding components of the mobile computing device 104 and is not repeated herein so as not to obscure the present disclosure.

The mobile computing device 104 further includes location circuitry 150 and sensors 152. The location circuitry 150 of the mobile computing device 104 may be embodied as any type of circuit capable of determining the precise or approximate position of the mobile computing device 104. For example, the location circuitry 150 may be embodied as a global positioning system (GPS) receiver, capable of determining the precise coordinates of the mobile computing device 104. Additionally or alternatively, the location circuitry 150 may be embodied as a local positioning system receiver capable of determining the position of the mobile computing device 104 using wireless beacons with known positions. In other embodiments, the location circuitry 150 may triangulate or trilaterate the position of the mobile computing device 104 using distances or angles to cellular network towers or other network transceivers with known positions, provided by the communication circuitry 148. In other embodiments, the location circuitry 150 may determine the approximate position of the mobile computing device 104 based on association to wireless networks with known positions, using the communication circuitry 148.

The sensors 152 may be embodied as any electronic device or devices usable to collect information that may be used to control the building systems 108, including information relevant to occupancy, occupant comfort, safety, security, or other building systems 108. The sensors 152 may include sensors typically included in a smart phone or other mobile device, such as motion or position sensors (e.g., accelerometers, gyroscopes, magnetic compasses, and other motion/position sensors), audio sensors, cameras, proximity sensors, ambient light sensors, touch input sensors, or similar sensors. In some embodiments, the sensors 152 may include sensors capable of measuring the environment of the mobile computing device 104, including sensors capable of measuring temperature, humidity, light levels, or other environmental sensors. The sensors 152 may also include "soft" or "fusion" sensors that generate information that is calculated or otherwise derived from sensor data produced by one or more other sensors 152 and/or from other information sources, such as user input. In some embodiments, the sensors 152 may include external sensor devices in communication with the mobile computing device 104, such as sensor devices (e.g., thermometers, humidity sensors, etc.) that communicate with the mobile computing device 104 using a personal area network technology such as Bluetooth® low energy.

The building controller 106 is configured to control one or more building systems 108 associated with the building 110. The building controller 106 may be embodied as any type of computation or computer device capable of performing the functions described herein, including, without limitation, a computer, a multiprocessor system, a server, a rack-mounted server, a blade server, a programmable logic controller, an embedded controller, an embedded system, a processor-based system, and/or a consumer electronic device. Thus, the building controller 106 may include a processor, an I/O subsystem, a memory, a data storage device, communication circuitry, and/or other components and devices commonly found in a computer or similar computing device. Those individual components of the building controller 106 may be similar to the corresponding components of the building automation application server 102 and/or the mobile computing device 104 and are not illustrated so as not to obscure the present disclosure. Additionally, although the building controller 106 is illustrated in FIG. 1 as embodied as a single computing device, it should be appreciated that the building controller 106 may be embodied as multiple devices (e.g., a network of building controllers 106 or a hierarchy of building controllers 106) cooperating together to control the building systems 108 and otherwise facilitate the functionality described below. In some embodiments (not shown) the building controller 106 and the building automation application server 102 may both be embodied in the same physical server device or collection of devices.

The building systems 108 may include any electronically or electromechanically controllable systems associated with the building 110 or collection of buildings 110. For example, the building systems 108 may include heating, ventilation, and air conditioning (HVAC) systems or other environmental comfort systems, lighting systems, security systems, safety systems, access control systems, electronic system controllers, programmable logic controllers, and other building systems. The building 110 may be embodied as a commercial building, a residential building, a multi-dwelling building, a high-rise building, or any other building associated with the building systems 108. Additionally, although illustrated as a building 110, it should be understood that the technologies of this disclosure may be applied to control systems for other occupied structures, spaces, or machines, such as vehicles.

The collection server 112 is configured to collect individualized sensor data produced by the mobile computing devices 104 and provide the individualized sensor data to the building automation application server 102. The collection server 112 may be embodied as any type of computation or computer device capable of performing the functions described herein, including, without limitation, a computer, a multiprocessor system, a server, a rack-mounted server, a blade server, a programmable logic controller, an embedded controller, an embedded system, a processor-based system, and/or a consumer electronic device. For example, the collection server 112 may be embodied as a web server accessible over a public network (e.g., a cloud server). Additionally or alternatively, the collection server 112 may be embodied as a local gateway device accessible over a local area network or other network associated with the building 110. In some embodiments, the collection server 112 may be embodied as or otherwise connected to one or more personal area network beacon devices (e.g., Bluetooth® low energy beacons) located in the building 110. Thus, the collection server 112 may include a processor, an I/O subsystem, a memory, a data storage device, communication circuitry, and/or other components and devices commonly found in a computer or similar computing device. Those individual components of the collection server 112 may be similar to the corresponding components of the building automation application server 102 and/or the mobile computing device 104 and are not illustrated so as not to obscure the present disclosure. Additionally, in some embodiments, the collection server 112 may be embodied as a "virtual server" formed from multiple computing devices distributed across the network 114 and operating in a public or private cloud. Accordingly, although the collection server 112 is illustrated in FIG. 1 as embodied as a single server computing device, it should be appreciated that the collection server 112 may be embodied as multiple devices cooperating together to facilitate the functionality described below. In some embodiments (not shown) the collection server 112 and the building automation application server 102 may both be embodied in the same physical server device or collection of devices.

As discussed in more detail below, the building automation application server 102, the mobile computing device 104, the building controller 106, and the collection server 112 may be configured to transmit and receive data with each other and/or other devices of the system 100 over the network 114. The network 114 may be embodied as any number of various wired and/or wireless networks. For example, the network 114 may be embodied as, or otherwise include, a wired or wireless local area network (LAN), a wired or wireless wide area network (WAN), a cellular network, and/or a publicly-accessible, global network such as the Internet. As such, the network 114 may include any number of additional devices, such as additional computers, routers, and switches, to facilitate communications among the devices of the system 100.

Figure 2:
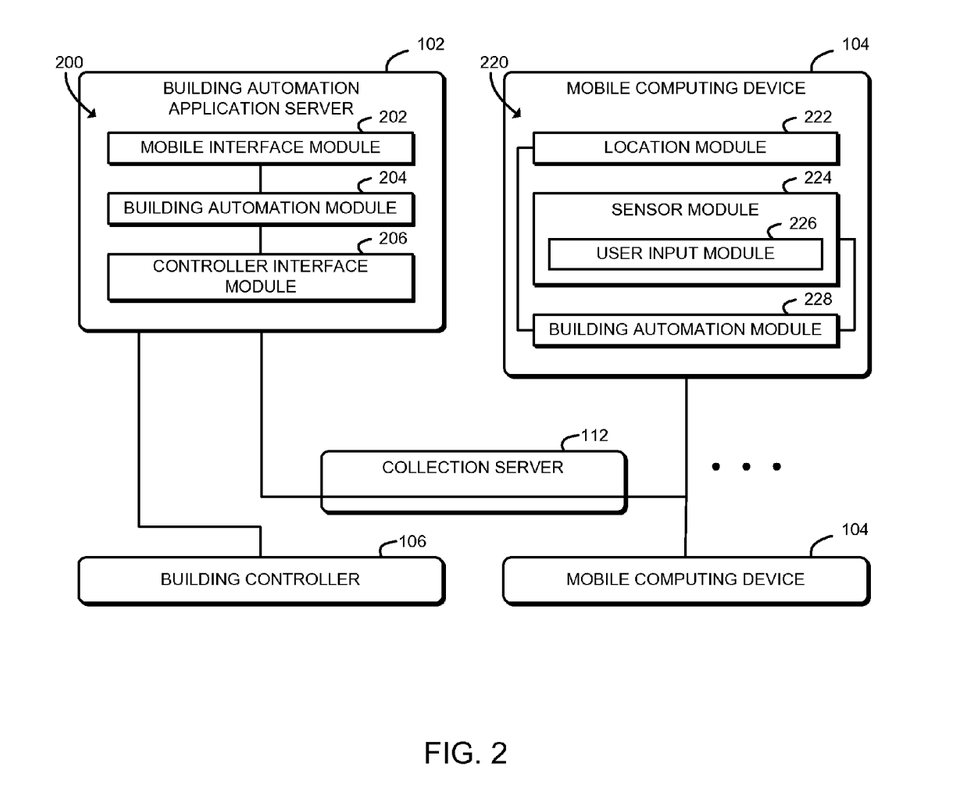
FIG. 2 is a simplified block diagram of at least one embodiment of various environments that may be established by the system of FIG. 1.

Referring now to FIG. 2, in an illustrative embodiment, the building automation application server 102 establishes an environment 200 during operation. The illustrative environment 200 includes a mobile interface module 202, a building automation module 204, and a controller interface module 206. The various modules of the environment 200 may be embodied as hardware, firmware, software, or a combination thereof. For example the various modules, logic, and other components of the environment 200 may form a portion of, or otherwise be established by, the processor 120 or other hardware components of the building automation application server 102. As such, in some embodiments, any one or more of the modules of the environment 200 may be embodied as a circuit or collection of electrical devices (e.g., a mobile interface circuit, a building automation circuit, etc.).

The mobile interface module 202 is configured to receive individualized sensor data from the mobile computing devices 104. The individualized sensor data is indicative of the location of each mobile computing device 104 and a building system control parameter measured or otherwise determined by the mobile computing device 104. For example, the individualized sensor data may be indicative of the environment at the location of the mobile computing device 104 or may be based on user input to the mobile computing device 104. The user input to the mobile computing device 104 may be received, for example, in response to surveys querying occupants about their comfort level, sent randomly to a small number of occupants (e.g., less than 5% of occupants) at various times during the day. The mobile interface module 202 may be further configured to transmit feedback data to the mobile computing device in response to configuring the building controller 106, as further described below. The mobile interface module 202 may be configured to receive the individualized sensor data and/or transmit the feedback data via the collection server 112.

The building automation module 204 is configured to determine a building system configuration based on the individualized sensor data. The building automation module 204 may be configured to optimize the building system configuration for cost, efficiency, or comfort based on the individualized sensor data. In some embodiments, the building automation module 204 may be configured to receive fixed sensor data from one or more fixed sensors throughout the building 110. For example, the fixed sensors may be included in one or more existing building systems, such as wireless networks (e.g., wireless access points), security systems, vending systems, or other systems. The building system configuration may also be determined based on the fixed sensor data.

The controller interface module 206 is configured to configure the building controller 106 based on the building system configuration determined based on the individualized sensor data. The building controller 106 controls one or more building systems 108 based on the building system configuration. For example, the building controller 106 may configure setpoints, enable systems, or otherwise control the building systems 108 as defined by the building system configuration.

Still referring to FIG. 2, in the illustrative embodiment, each mobile computing device 104 establishes an environment 220 during operation. The illustrative environment 220 includes a location module 222, a sensor module 224, and a building automation module 228. The various modules of the environment 220 may be embodied as hardware, firmware, software, or a combination thereof. For example the various modules, logic, and other components of the environment 220 may form a portion of, or otherwise be established by, the processor 140 or other hardware components of the mobile computing device 104. As such, in some embodiments, any one or more of the modules of the environment 220 may be embodied as a circuit or collection of electrical devices (e.g., a location circuit, a sensor circuit, etc.).

The location module 222 is configured to determine the location of the mobile computing device 104. For example, the location module 222 may be configured to determine the location of the mobile computing device 104 using the location circuitry 150 and/or using the communication circuitry 148. In some embodiments, the location module 222 may be configured to determine whether the mobile computing device 104 is located at the building 110 or within a certain part of the building 110 (e.g., a room, floor, zone, etc.).

The sensor module 224 is configured to receive sensor data from the sensors 152 of the mobile computing device 104. The sensor data is indicative of a building system control parameter. In some embodiments, the sensor module 224 may be configured to receive environmental sensor data. In some embodiments, the sensor module 224 may be configured to monitoring user input for data that is indicative of a user sentiment regarding a building system 108 (e.g., monitoring for a message stating, "It's too cold in here" or similar). In some embodiments, those functions may be performed by one or more sub-modules, such as a user input module 226.

The building automation module 228 is configured to generate individualized sensor data that is indicative of the location of the mobile computing device 104, the current time, and the sensor data received from the sensors 152. The building automation module 228 is further configured to transmit the individualized sensor data to the building automation application server 102. The building automation module 228 may be configured to determine whether to upload the individualized sensor data, for example based on the device location or on user privacy preferences. The building automation module 228 may be configured to receive feedback data from the building automation application server 102 that is indicative of a building system configuration that has been applied to the building 110. In some embodiments, the building automation module 228 may be configured to transmit the individualized sensor data and/or receive the feedback data via the collection server 112.

Figure 3:
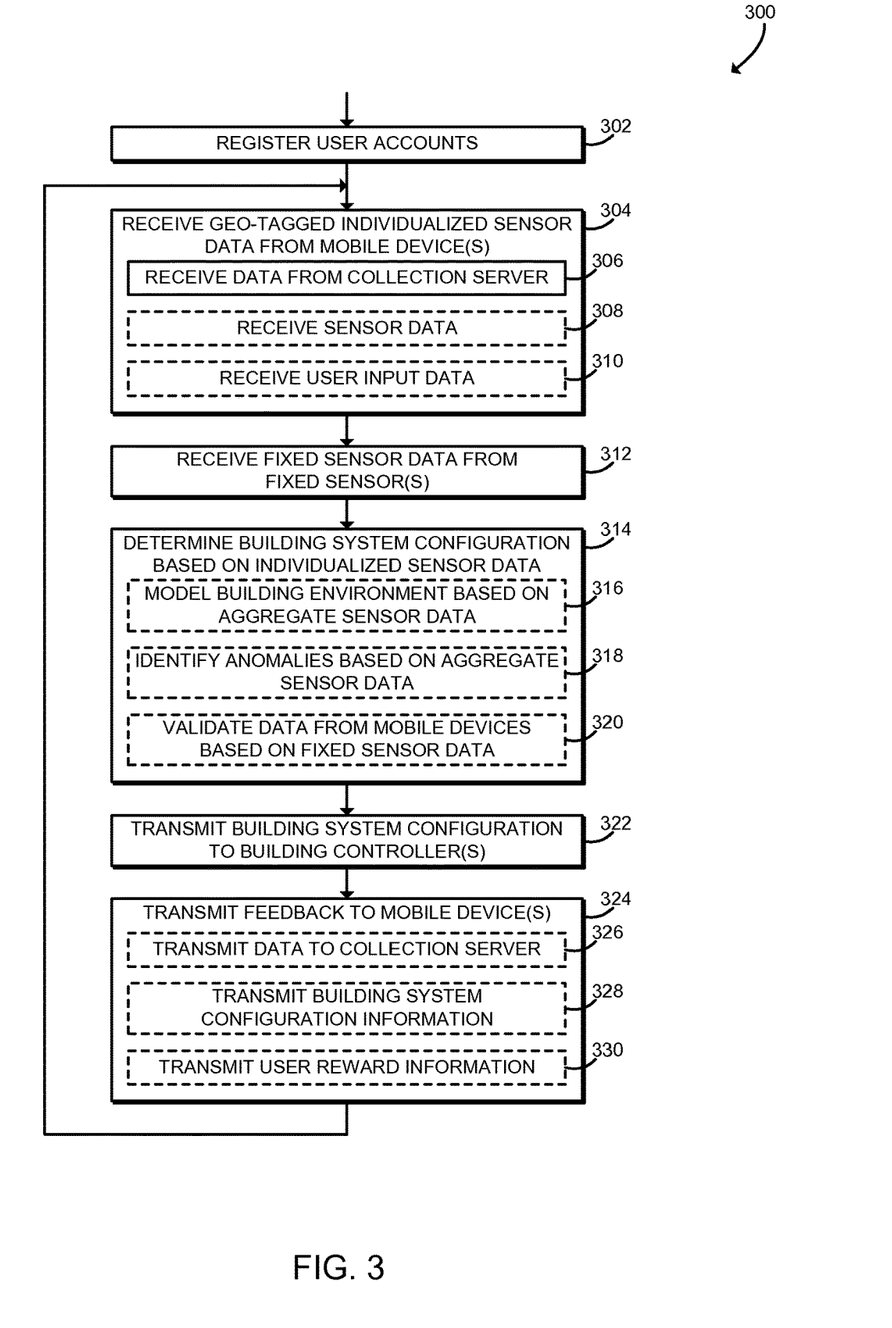
FIG. 3 is a simplified flow diagram of at least one embodiment of a method for individualized building automation that may be executed by a building automation server of the system of FIGS. 1 and 2.

Referring now to FIG. 3, in use, the building automation application server 102 may execute a method 300 for individualized building automation. The method 300 begins with block 302, in which the building automation application server 102 registers one or more user accounts associated with the mobile computing devices 104. As part of the registration process, the building automation application server 102 may record privacy preferences associated with each user account. For example, the privacy preferences may indicate whether a user has opted out of providing sensor data to the building automation application server 102 or whether the user has agreed to a privacy policy.

In block 304, the building automation application server 102 receives geo- and time-tagged individualized sensor data from one or more of the mobile computing devices 104. The individualized sensor data is geo-tagged, meaning that it includes or is otherwise associated with geographical data indicating the location of the associated mobile computing device 104. The geographical data may indicate the location of the mobile computing device 104 at any appropriate resolution. For example, in some embodiments, the geographical data may indicate whether the mobile computing device 104 is located at or within the building 110. Additionally or alternatively, the geographical data may identify particular rooms, zones, or other areas within the building 110. The individualized sensor data may be embodied as any data that may be used to control the building systems 108. For example, the individualized sensor data may be used as a parameter, input, or other reference to one or more control algorithms. As a further example, the individualized sensor data may be embodied as time-coded temperature measurements or other environmental sensor measurements that may be used to control a heating, ventilation, and air conditioning (HVAC) system.

In block 306, the building automation application server 102 receives the individualized sensor data from the collection server 112. The collection server 112 may be embodied as a web server, a cloud server, or other server accessible to the building automation application server 102 using a public network such as the Internet. Additionally or alternatively, the collection server 112 may be embodied as a gateway device or other computing device accessible to the building automation application server 102 using a local area network associated with the building 110. In some embodiments, the collection server 112 may be embodied as or coupled with a personal area network beacon device such as a Bluetooth® low energy beacon located within the building 110.

In some embodiments, in block 308 the building automation application server 102 may receive individualized sensor data that includes or was generated from sensor data collected by the mobile computing device 104. For example, the building automation application server 102 may receive sensor data indicative of the environment of the mobile computing device 104, such as audio data, visual/camera data, temperature data, humidity data, light level data, or other environmental data. In some embodiments, in block 310 the building automation application server 102 may receive individualized sensor data that includes or was generated from user input data received by the mobile computing device 104. For example, the building automation application server 102 may receive user preferences or settings input by the user into a building automation application. In some embodiments, individualized sensor data may be indicative of a user sentiment expressed by the user in the user input. For example, the user may input text or images regarding the user's current comfort level (e.g., text indicating the current temperature). The building automation application server 102 and/or the mobile computing device 104 may parse or otherwise analyze the user input to determine user sentiment.

In block 312, the building automation application server 102 may receive fixed sensor data from one or more fixed sensors positioned in the building 110. For example, the building automation application server 102 may receive temperature data, humidity data, light level data, or other sensor data indicative of the environment of the building 110. The building automation application server 102 may communicate with the fixed sensors using an existing building automation communication system (e.g., an existing wired network, wireless network, or other communication system).

In block 314, the building automation application server 102 determines a building system configuration for the building systems 108 based on the individualized sensor data. The building automation application server 102 may determine one or more configuration settings, setpoints, on/off status, or other controllable parameters of the building systems 108. The building automation application server 102 may determine the building system configuration to tune the building controller 106 to achieve a desired outcome in terms of cost, energy efficiency, occupant comfort, and/or a combination of those factors. Individualized sensor data received from multiple mobile computing devices 104 may provide much more thorough and complete data regarding the occupied parts of the building 110 when compared to the data received from fixed sensors alone. By incorporating the individualized sensor data received from multiple mobile computing devices 104, the building automation application server 102 may optimally individualize the building system configuration for the individual users associated with the mobile computing devices 104. Thus, the building automation application server 102 may determine a building system configuration to provide a more optimal balance of comfort and energy efficiency that is individualized to each user.

In some embodiments, in block 316 the building automation application server 102 may model or otherwise measure the environment of the building 110 based on the aggregate individualized sensor data received from the mobile computing devices 104 and/or the fixed sensor data received from the fixed sensors. For example, the building automation application server 102 may use distributed majority algorithms to accurately determine the temperature, humidity, light level, or other environmental factors for the building 110 or for parts of the building 110. As another example, the building automation application server 102 may determine whether particular parts of the building 110 are occupied based on the individualized sensor data. The building automation application server 102 may optimize or otherwise determine comfort setpoints (e.g., desired temperature or humidity) for parts of the building 110 based on the preferences of users associated with mobile computing devices 104 located within those parts of the building 110. Similarly, the building automation application server 102 may optimize or otherwise determine building system 108 settings or other settings required to achieve those setpoints. For example, the building automation application server 102 may use a heat transfer model to determine coverage of a desired temperature in a part of the building 110 and how quickly or slowly the change takes effect. Such data may be used to improve the efficiency of the building systems 108 (e.g., by improving the placement of vents).

In block 318, the building automation application server 102 may identify any anomalies in the individualized sensor data based on the aggregate individualized sensor data. The building automation application server 102 may, for example, identify individualized sensor data that exceeds particular expected limits (e.g., expected temperature or humidity limits). The building automation application server 102 may disregard anomalous individualized sensor data. In block 320, the building automation application server 102 may validate the individualized sensor data received from the mobile computing devices 104 using fixed sensor data received from the fixed sensors. For example, the building automation application server 102 may use the fixed sensors to determine the expected limits for particular measurements.

In block 322, the building automation application server 102 transmits the building system configuration to the building controller 106. The building controller 106 configures, programs, or otherwise controls the building systems 108 to implement the building system configuration. For example, the building controller 106 may establish temperature setpoints for various parts of the building 110. The building automation application server 102 may use any appropriate technique for transmitting the building system configuration to the building controller 106, such as transmitting a command using the network 114 or transmitting a command using a direct communication link with the building controller 106.

In block 324, the building automation application server 102 transmits feedback to the mobile computing devices 104 based on the building system configuration determined as described above. In some embodiments, in block 326, the building automation application server 102 transmits the feedback data to the collection server 112, from which the feedback data is retrieved by the mobile computing devices 104. In block 328, in some embodiments the building automation application server 102 transmits building system configuration information as part of the feedback data. For example, the building automation application server 102 may transmit information indicating changes made to the building system configuration based on individualized sensor data provided by the mobile computing device 104. Providing feedback on the building system configuration may motivate users to continue to provide individualized sensor data and otherwise engage with the system 100. In some embodiments, in block 330 the building automation application server 102 may transmit user reward information to the mobile computing devices 104. User reward information may be embodied as any reward or other incentive that may encourage users to provide individualized sensor data and otherwise engage with the system 100. For example, the user reward information may be embodied as discounts for certain services provided in the building 110. After transmitting feedback to the mobile computing devices 104, the method 300 loops back to block 304 to continue processing individualized sensor data received from the mobile computing devices 104.

Figure 4:
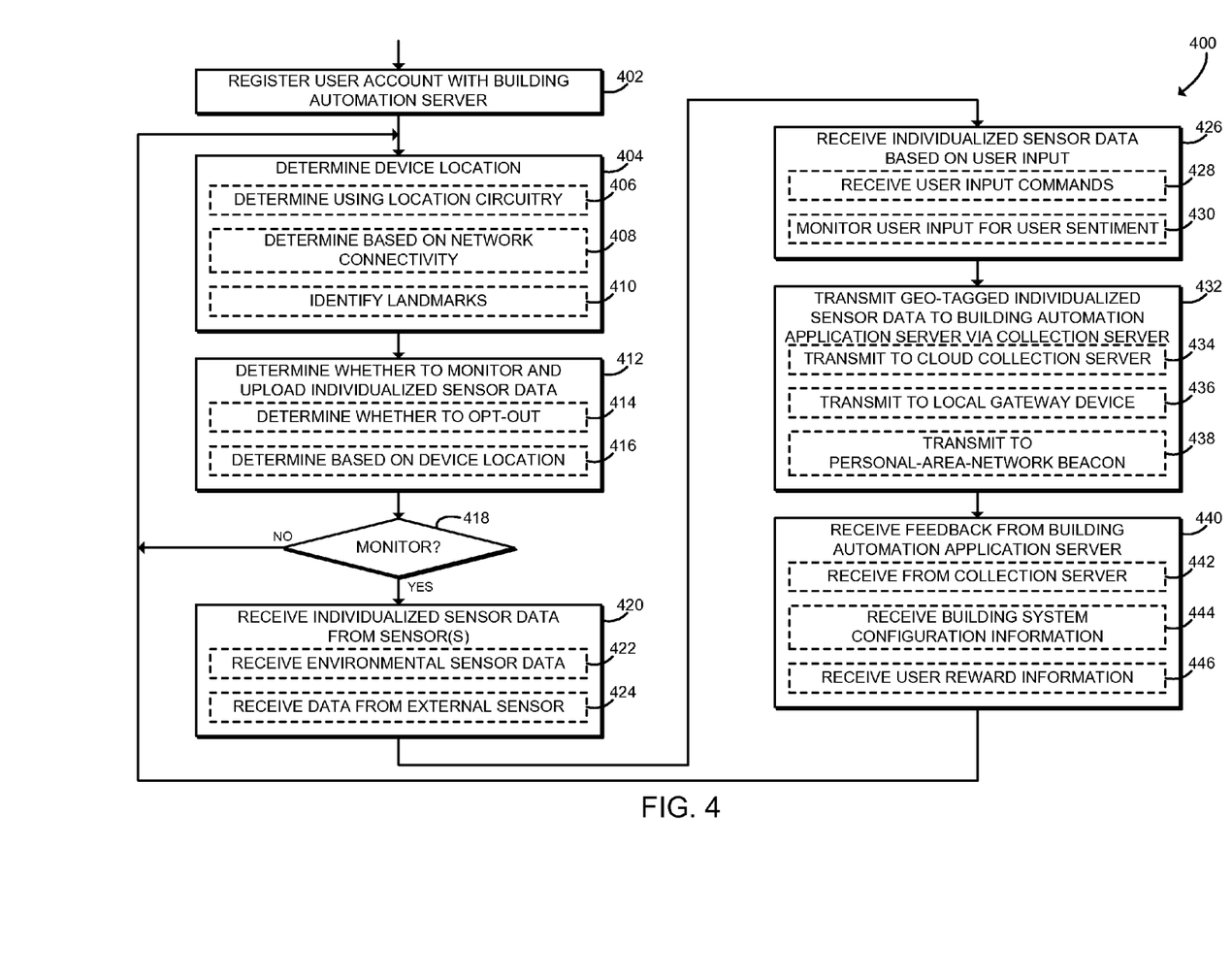
FIG. 4 is a simplified flow diagram of at least one embodiment of a method for individualized building automation that may be executed by a mobile computing device of the system of FIGS. 1 and 2.

Referring now to FIG. 4, in use, a mobile computing device 104 may execute a method 400 for individualized building automation. The method 400 begins with block 402, in which the mobile computing device 104 registers a user account with the building automation application server 102. As described above, the mobile computing device 104 may transmit privacy preferences associated with the user account to the building automation application server 102.

For example, the privacy preferences may indicate whether the user has agreed to a privacy policy or opted out of providing sensor data to the building automation application server 102.

In block 404, the mobile computing device 104 determines its location. The mobile computing device 104 may use any technique or combination of techniques for determining device location. In some embodiments, in block 406 the mobile computing device 104 may determine the device location using the location circuitry 150. For example, the mobile computing device 104 may determine coordinates of the device location using a GPS receiver or similar location circuitry. In some embodiments, in block 408 the mobile computing device 104 may determine the device location based on available network connectivity. For example, the mobile computing device 104 may determine whether one or more wireless networks associated with the building 110 are accessible. In block 410, the mobile computing device 104 may determine the device location by identifying one or more landmarks near the mobile computing device 104. The mobile computing device 104 may, for example, monitor sensor data such as image data provided by a camera of the mobile computing device 104 to identify landmarks within the building 110. As another example, the mobile computing device 104 may monitor audio input data or other user input data for references to landmarks within the building 110. Continuing that example, the mobile computing device 104 may monitor user input for text messages identifying landmarks such as, "I'm by the fountain" or "At the main entrance."

In block 412, the mobile computing device 104 determines whether to monitor and upload individualized sensor data to the building automation application server 102. In some embodiments, in block 414, the mobile computing device 104 may determine whether the user has opted out of providing the individualized sensor data. The mobile computing device 104 may make that determination based on user privacy preferences, security settings, or other policy settings associated with the mobile computing device 104 and/or the current user. In some embodiments, in block 416, the mobile computing device 104 may determine whether to upload the individualized sensor data based on the device location. For example, the mobile computing device 104 may only upload the individualized sensor data when the mobile computing device 104 is located at the building 110. Of course, in some embodiments the mobile computing device 104 may upload individualized sensor data when the mobile computing device 104 is away from the building 110. For example, building safety systems 108 may benefit from knowing which mobile computing devices 104 are away from the building 110 in the event of a fire or other emergency. Additionally, although illustrated as determining whether to monitor and upload the individualized sensor data, it should be understood that in other embodiments the mobile computing device 104 may make those determinations separately. For example, in some embodiments the mobile computing device 104 may monitor the individualized sensor data locally without uploading the individualized sensor data to the building automation application server 102.

In block 418, the mobile computing device 104 checks whether to monitor the individualized sensor data. If not, the method 400 loops back to block 404 to continue monitoring the device location. If the mobile computing device 104 determines to monitor the individualized sensor data, the method 400 advances to block 420.

In block 420, the mobile computing device 104 receives individualized sensor data from one or more of the sensors 152. The individualized sensor data may be embodied as any data that may be used to control the building systems 108. For example, the individualized sensor data may be used as a parameter, input, or other reference to one or more control algorithms. In some embodiments, in block 422 the mobile computing device 104 receives environmental sensor data from the sensors 152. The environmental sensor data may include data indicative of the environment of the mobile computing device 104, such as audio data, visual/camera data, temperature data, humidity data, light level data, or other environmental data. In some embodiments, in block 424 the mobile computing device 104 may receive sensor data from an external sensor device such as a thermostat, humidity sensor, or other external environmental sensor. The mobile computing device 104 may communicate with the external sensor device using a personal area network technology such as Bluetooth® low energy.

In block 426, the mobile computing device 104 receives individualized sensor data based on user input. The individualized sensor data may include user input or may be generated from user input received by the mobile computing device 104. In some embodiments, in block 428 the mobile computing device 104 may receive user input commands providing the individualized sensor data. For example, the mobile computing device 104 may receive preferences or settings input by the user into a building automation application. In some embodiments, in block 430 the mobile computing device 104 may monitor user input for user sentiment that indicates the user's comfort level. For example, the user may input text that indicates the user's current comfort level (e.g., entering a text message stating, "It's too cold in here"). The mobile computing device 104 may parse or otherwise analyze the user input to determine the user sentiment, or the mobile computing device 104 may transmit the user input to the building automation application server 102 for analysis.

In block 432, the mobile computing device 104 transmits geo- and time-tagged individualized sensor data to the building automation application server 102 via the collection server 112. As described above, the individualized sensor data is geo-tagged, meaning that it includes or is otherwise associated with geographical data indicating the location of the mobile computing device 104. The geographical data may indicate the location of the mobile computing device 104 at any appropriate resolution. For example, in some embodiments, the geographical data may indicate whether the mobile computing device 104 is located at or within the building 110. Additionally or alternatively, the geographical data may identify particular rooms, zones, or other areas within the building 110. In some embodiments, the building automation application server 102 may fine-tune the geographical data using data from other sensors to more accurately determine the location of the mobile computing device 104. In some embodiments, in block 434 the mobile computing device 104 may transmit the individualized sensor data to a cloud collection server 112. The cloud collection server 112 may be embodied as a web server, a cloud server, or other server accessible to the mobile computing device 104 and the building automation application server 102 using a public network such as the Internet. In some embodiments, in block 436, the mobile computing device 104 may transmit the individualized sensor data to a collection server 112 that is embodied as a local gateway device or other computing device accessible to the mobile computing device 104 using a local area network associated with the building 110. In some embodiments, in block 438 the mobile computing device 104 may transmit the individualized sensor data to a personal area network beacon device such as a Bluetooth® low energy beacon. Transmitting the individualized sensor data to using a personal area network protocol may avoid transmitting data over one or more wireless networks and thus may reduce power consumption and/or data transmission costs for some users.

In block 440, the mobile computing device 104 receives feedback data from the building automation application server 102 in response to transmitting the individualized sensor data. The mobile computing device 104 may present the feedback data to the user, for example by displaying the feedback information in a building automation application. In some embodiments, in block 442, the mobile computing device 104 may receive the feedback data from the collection server 112, which in turn received the feedback data from the building automation application server 102. In some embodiments, in block 444 the mobile computing device 104 may receive building system configuration information as part of the feedback data. For example, the mobile computing device 104 may receive information indicating changes made to the building system configuration based on the individualized sensor data provided by the mobile computing device 104. Providing feedback on the building system configuration and actions taken may motivate the user to continue to provide individualized sensor data and otherwise engage with the system 100. In some embodiments, in block 446 the mobile computing device 104 may receive user reward information from the building automation application server 102. User reward information may be embodied as any reward or other incentive that may encourage the user to provide individualized sensor data and otherwise engage with the system 100. For example, the user reward information may be embodied as discounts for certain services provided in the building 110. After receiving feedback, the method 400 loops back to block 404 to continue monitoring individualized sensor data.

The invention claimed is:

1. A computing device for automation individualization of a building, the computing device comprising:
mobile interface circuitry to receive individualized sensor data generated by a plurality of mobile computing devices, each of the plurality of mobile computing devices being a general purpose computing device that is not dedicated for use with a building management system, wherein the individualized sensor data received from each mobile computing device includes a location of that individual mobile computing device, a measurement of an environment of that individual mobile computing device, and a time associated with the measurement of the environment, wherein the measurement of the environment is indicative of a building system control parameter;
building automation circuitry to determine a building system configuration based on the individualized sensor data received from the plurality of mobile computing devices, wherein the building automation circuitry is configured to aggregate individualized sensor data to model the building and to identify one or more anomalies in the measurement of the environment of an individual mobile computing device as exceedance of one or more expected measurement limits, wherein the building automation circuitry is configured to determine the one or more expected measurement limits based on building data received from one or more fixed sensors; and
controller interface circuitry to configure a building controller based on the building system configuration to control a building system.

2. The computing device of claim 1, wherein:
the building data is indicative of the building system control parameter; and
to determine the building system configuration comprises to determine the building system configuration based on the individualized sensor data received from the plurality of mobile computing devices and the building data received from the one or more fixed sensors.

3. The computing device of claim 1, wherein to determine the building system configuration based on the individualized sensor data comprises to optimize the building system configuration for cost, efficiency, or comfort based on the individualized sensor data.

4. The computing device of claim 1, wherein to determine the building system configuration based on the individualized sensor data comprises to:
determine a value of the building system control parameter based on the individualized sensor data; and
determine the building system configuration based on the value of the building system control parameter.

5. The computing device of claim 1, wherein the mobile interface circuitry is further to:
transmit feedback data to one of the plurality of mobile computing devices in response to configuration of the building controller based on the building system configuration determined based on the individualized sensor data received from the one of the plurality of mobile computing devices.

6. The computing device of claim 1, wherein to receive the individualized sensor data from the plurality of mobile computing devices comprises to receive the individualized sensor data via a collection server.

7. The computing device of claim 6, wherein to receive the individualized sensor data comprises to connect to the collection server via a public network.

8. The computing device of claim 6, wherein to receive the individualized sensor data comprises to connect to the collection server via a local area network of the building.

9. The computing device of claim 6, wherein the collection server comprises a personal area network beacon device.

10. The computing device of claim 1, wherein each of the plurality of mobile computing devices is a smart phone.

11. The computing device of claim 1, wherein the measurement of the environment of the individual mobile computing device includes at least one of temperature, humidity, and ambient light in a room presently occupied by the individual mobile computing device.

12. A method for building automation individualization of a building, the method comprising:
receiving, by a computing device, individualized sensor data generated by a plurality of mobile computing devices, each of the plurality of mobile computing devices being a general purpose computing device that is not dedicated for use with a building management system, wherein the individualized sensor data received from each mobile computing device includes a location of that individual mobile computing device, a measurement of an environment of that individual mobile computing device, and a time associated with the measurement of the environment, wherein the measurement of the environment is indicative of a building system control parameter;

determining, by the computing device, a building system configuration based on the individualized sensor data received from the plurality of mobile computing devices, including determining one or more expected measurement limits based on building data received from fixed sensors, and aggregating the received individualized sensor data to model the building and to identify one or more anomalies in the measurement of the environment of an individual mobile computing device as exceedance of the one or more expected measurement limits; and configuring, by the computing device, a building controller based on the building system configuration to control a building system of the building.

13. The method of claim 12, wherein determining the building system configuration based on the individualized sensor data comprises optimizing the building system configuration for cost, efficiency, or comfort based on the individualized sensor data.

14. The method of claim 12, wherein determining the building system configuration based on the individualized sensor data comprises:

determining a value of the building system control parameter based on the individualized sensor data; and determining the building system configuration based on the value of the building system control parameter.

15. The method of claim 12, further comprising:

transmitting, by the computing device, feedback data to one of the plurality of mobile computing devices in response to configuring the building controller based on the building system configuration determined based on the individualized sensor data received from the one of the plurality of mobile computing devices.

16. The method of claim 12, wherein receiving the individualized sensor data from the plurality of mobile computing devices comprises receiving the individualized sensor data via a collection server.

17. The method of claim 12, wherein each of the plurality of mobile computing devices is a smart phone.

18. Apparatus for building automation individualization of a building, the apparatus comprising:

a plurality of mobile computing devices, each of the plurality of mobiles being a general purpose computing device that is not dedicated for use with a building management system and comprising:

location circuitry to determine a location of the mobile computing device;

sensor circuitry to receive a measurement of an environment of the mobile computing device from a sensor of the mobile computing device, wherein the measurement of the environment is indicative of a building system control parameter; and data circuitry to (i) generate individualized sensor data, wherein the individualized sensor data includes the location of the computing device, the measurement of the environment, and a time associated with the measurement of the environment, (ii) determine whether to upload the individualized sensor data, and (iii) transmit the individualized sensor data to a building automation application server associated with the building in response to a determination to upload the individualized sensor data; and building automation circuitry configured to determine one or more expected measurement limits based on building data received from one or more fixed sensors, and to aggregate individualized sensor data from the plurality of mobile computing devices to model the building to identify one or more anomalies in the measurement of the environment of an individual mobile computing device as exceedance of the one or more expected measurement limits.

19. The apparatus of claim 18, wherein to determine the location of the computing device comprises to determine whether the computing device is located at the building.

20. The apparatus of claim 18, wherein to determine whether to upload the individualized sensor data comprises to determine whether to upload the individualized sensor data based on the location of the computing device.

21. The apparatus of claim 18, wherein the receive the measurement of the environment comprises to receive at least one of temperature sensor data, humidity sensor data, motion sensor data, ambient light sensor data, camera data, audio sensor data, and sensor fusion data.

22. The apparatus of claim 18, wherein to receive the measurement of the environment comprises to receive the measurement from a sensor device external to the mobile computing device.

23. The apparatus of claim 18, wherein to receive the measurement of the environment comprises to monitor user input to the computing device, wherein the user input is indicative of a user sentiment regarding the building system control parameter.

24. The apparatus of claim 18, wherein each of the plurality of mobile computing devices is a smart phone.

* * * * *